Aug. 28, 1928.  H. D. MATTHEWS  1,682,391
TEMPERATURE CONTROL SYSTEM
Filed June 23, 1926
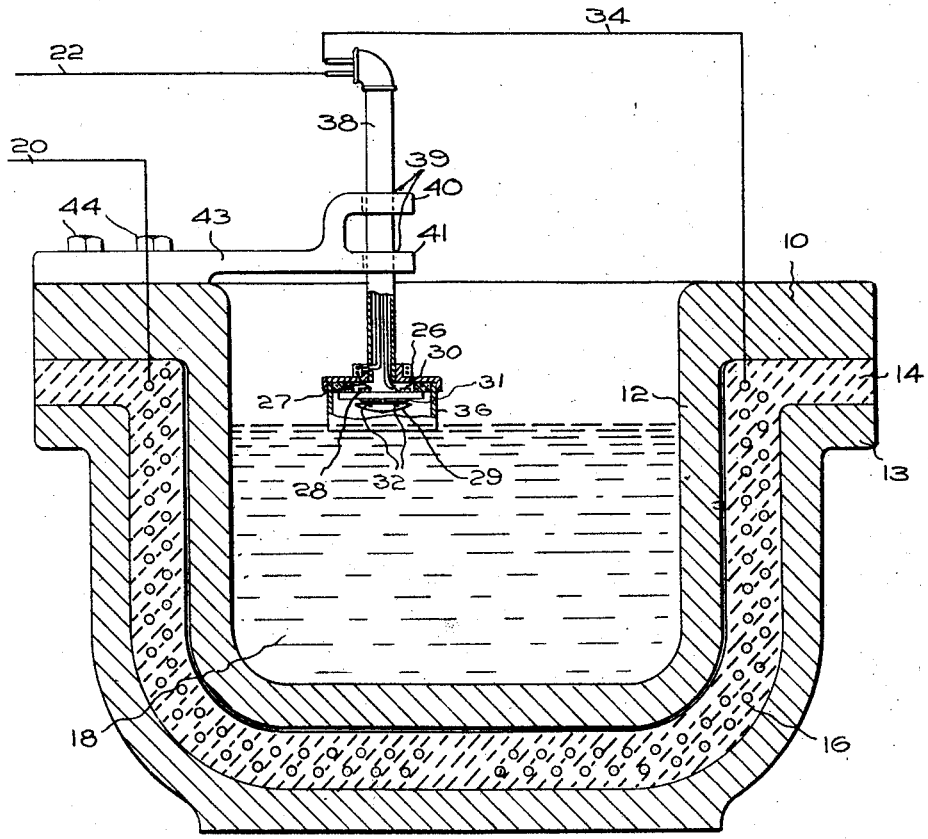
WITNESSES:
R. S. Harrison
A. R. Greene
INVENTOR
Howard L. Matthews
BY Chesley G. Carr
ATTORNEY Patented Aug. 28, 1928.

1,682,391

UNITED STATES PATENT OFFICE.

HOWARD D. MATTHEWS, OF MANSFIELD, OHIO, ASSIGNOR TO WESTINGHOUSE ELECTRIC & MANUFACTURING COMPANY, A CORPORATION OF PENNSYLVANIA.

TEMPERATURE-CONTROL SYSTEM.

Application filed June 23, 1926. Serial No. 117,908.

My invention relates to temperature-control systems and particularly to systems for electrically controlling the heating of solder or other material in a container.

An object of my invention is to provide a simple, efficient, and inexpensive system for controlling the heating of material.

Another object of my invention is to provide a control system that shall maintain the proper temperature of a container independently of the quantity of material in the container.

Another object of my invention is to provide a temperature-control system for a solder pot or other container that shall be, at all times, responsive to the temperature at the surface of the material therein.

Another object of my invention is to provide, in a thermostatic-control system for material-heating devices, means for causing a thermostat having a normally wide differential to respond to a comparatively small difference in temperature of the material that is being heated.

Other objects will be obvious from the disclosure.

In the use of electrically heated solder pots and other similar devices, material is withdrawn from time to time and more material added, so that there will be a varying volume of material in the pot. The ordinary workman does not dip down to the bottom of the pot when he wishes to take out molten solder but dips in usually towards the top of the pot.

The material at the bottom and sides of the pot will be hotter than at the top, since the top of the solder is exposed to the cooling action of air. It is, therefore, desirable to provide means to regulate the heating of the solder in accordance with the temperature at its top. Therefore, I provide means for maintaining a temperature-governing device near the top of the solder.

In the manner of carrying out my invention herein disclosed, I provide means for maintaining a thermostatic switch in proximity to the top surface of the material being heated. This switch governs the operation of the heating means. Means are also provided to subject the thermostat to the cooling action of the air outside the material container and to the heating action of an auxiliary heater.

The single figure of the accompanying drawing is a cross-sectional view of a solder pot with my improved control system attached thereto.

Referring to the drawing, a solder pot 10 or other container for heating material is composed of an inner member 12 and an outer member 13, both preferably metallic. The inner and outer members are separated by refractory insulating material 14, that has an electric heating winding 16 embedded therein. The material to be heated is designated by the reference numeral 18.

The means for energizing the heating winding 16 comprises a conductor 20 that is secured to one end of the winding, and a conductor 22 that is attached to an auxiliary heater member 26.

The auxiliary heater member 26 has a conductor 27 electrically connected to a terminal member 28 of a thermostatic switch 29. The thermostat is preferably of the snap acting type disclosed in the patent to J. A. Spencer, No. 1,448,240, granted March 13, 1923. The thermostatic switch has suitable registering contact members 31 and 32.

The other terminal member 30 of the thermostatic switch is electrically connected to a conductor 34. The conductor 34 is connected to the winding 16. The conductors 20 and 22 are electrically connected to a source of current (not shown).

Assuming that the conductor 22 is connected to the positive terminal of the source of current, the path of current will be through the conductor 22, the auxiliary heating member 26, the conductor 27, terminal 28, the thermostatic switch 29, terminal 30, conductor 34, heating winding 16, and the conductor 20 to the source of current.

The thermostatic switch is secured, as shown, inside the receptacle 36 which, as shown in the drawing, floats on the surface of the liquid material 18. The auxiliary heating member 26 rests on the top wall of the receptacle 36.

A conduit 38 is secured, by suitable means, to the top of the receptacle 36 and is slidably mounted in openings 39 of a pair of vertically disposed guide members 40 and 41 which are shown as integral with a bracket member 43. The bracket member 43 is preferably secured by suitable means, such as studs 44, to the container 10. The conduit 38 is preferably open at its top so that the receptacle 36 is in communication with the air outside the container 10.

It will thus be seen that I have provided a means for controlling the heating of the container 10 and, therefore, the temperature of the material 18, that will be responsive to the temperature conditions at the surface of the material 18. Of course, the receptacle 36 and the conduit 38 might be so designed as to maintain the thermostat at some other predetermined position than that shown, either above or below the surface of the material 18.

Since the Spencer-type thermostat is what may be called a wide-differential thermostat, that is, one in which a relatively large change of temperature is necessary to cause it to operate, I provide means to cause it to operate on a small change of temperature. Such means, in the present embodiment of my invention, consists of the receptacle 36 and the auxiliary heating member 26 which is described and shown as connected in series with the heating coil 16.

If we consider the material 18 as being cool and subject the winding 16 to an electric current for heating the material, this current will also pass through the auxiliary heating member 26 and thus heat the thermostat more quickly than it would be if it were merely subjected to the heat of the material 18, so that it will act more quickly upon a given increase of temperature of the material than it would if it were subjected only to the heat of the material.

On the other hand, if the heating winding 16 has been energized for some time, so that the material 18 is at the desired temperature and the thermostat switch 29 has opened to cut off the supply of current to the heating coil 16, the air surrounding the receptacle 36 will cause the thermostat to cool off more quickly and, therefore, to close the circuit of the heating winding more quickly than if the thermostat were not exposed to the air outside of the container.

It will thus be seen that I have provided a means acting upon a relatively small change of temperature for controlling the heating of material, that will be responsive to the temperature conditions existing at or near the surface of the material.

While I have shown and described for purposes of illustration a particular form of my invention, it may, of course, be embodied in other forms without departing from the spirit and scope as set forth in the appended claims.

I claim as my invention:

1. The combination with a liquid container, of electric means for heating the liquid, a thermostatic switch electrically connected to said heating means for controlling the energization thereof, and means for maintaining said thermostatic switch in proximity to the surface of the liquid.

2. In a system for controlling the heating of a liquid container having electric heating means, in combination, supporting means adapted to float on the surface of said liquid, and a thermostatic switch mounted on said supporting means and electrically connected to said electric heating means for controlling the same.

3. In a system for controlling the heating of a varying volume of liquid in a container having electric heating means, in combination, a receptacle adapted to float on the surface of the liquid, guide means for maintaining said receptacle in the proper position, and a thermostatic switch secured inside said receptacle, said switch being electrically connected to the electric heating means for controlling the heating of said liquid.

4. In a system for controlling the heating of a varying volume of material in a pot having electric heating means, in combination, a receptacle adapted to float on the surface of the material, a bracket secured to said pot and extending over said material, said bracket having guide members provided with openings therein, a vertical conduit opening at its lower end into said receptacle and slidably mounted in the openings of said guide members, the upper end of said conduit being open, a thermostatic switch positioned in said receptacle and secured thereto, and a pair of conductors extending through said conduit and electrically connected, at their lower ends, to said switch, said conductors being electrically connected at their other ends to said electric heating means.

In testimony whereof, I hereunto subscribe my name this 9 day of June, 1926.

HOWARD D. MATTHEWS.